(12) United States Patent
Obata

(10) Patent No.: US 7,085,371 B2
(45) Date of Patent: Aug. 1, 2006

(54) PUSH-BUTTON SIGNAL RECEIVING DEVICE AND A GAIN CONTROL METHOD

(75) Inventor: Atsushi Obata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 323 days.

(21) Appl. No.: 10/100,918

(22) Filed: Mar. 20, 2002

(65) Prior Publication Data

US 2003/0007630 A1 Jan. 9, 2003

(30) Foreign Application Priority Data

Jul. 3, 2001 (JP) ............................. 2001-202548

(51) Int. Cl.
*H04M 1/00* (2006.01)
*H04M 3/00* (2006.01)

(52) U.S. Cl. ............ 379/386; 379/387.01; 379/388.03; 379/390.03; 379/395

(58) Field of Classification Search ............... 379/283, 379/386, 387.01, 388.03, 390.03, 395, 263
See application file for complete search history.

(56) References Cited

U.S. PATENT DOCUMENTS

| | | | | |
|---|---|---|---|---|
| 4,028,493 A | * | 6/1977 | Brennemann et al. ... | 379/93.37 |
| 4,868,872 A | * | 9/1989 | Roberts et al. ............ | 379/386 |
| 4,899,365 A | * | 2/1990 | Hove ........................ | 375/231 |
| 5,408,529 A | * | 4/1995 | Greaves ..................... | 379/386 |
| 5,459,785 A | * | 10/1995 | Noda ........................ | 379/386 |
| 5,699,421 A | * | 12/1997 | Nirshberg et al. .......... | 379/386 |
| 5,818,929 A | * | 10/1998 | Yaguchi ..................... | 379/418 |
| 5,926,541 A | * | 7/1999 | Irie ............................ | 379/372 |
| 5,974,137 A | * | 10/1999 | Sheets et al. ............... | 379/347 |
| 6,014,441 A | * | 1/2000 | Mark ......................... | 379/361 |
| 6,094,481 A | * | 7/2000 | Deville et al. ............ | 379/388.03 |
| 6,650,878 B1 | * | 11/2003 | Abe et al. ................. | 455/232.1 |

OTHER PUBLICATIONS

Patent Abstract of Japan, Publication No. 54095108 A, Publication Date Jul. 27, 1979.

* cited by examiner

*Primary Examiner*—Quochien B. Vuong
*Assistant Examiner*—Tuan Pham
(74) *Attorney, Agent, or Firm*—Arent Fox PLLC

(57) ABSTRACT

A push-button signal receiving device and a gain control method whereby error in validity determination of a received signal that accompanies the insertion of an AGC circuit can be prevented. An input bush-button signal is amplified by amplifying circuit and separated into signals of low- and high-frequency bands by first and second bandpass filters, respectively. Dialed number identifying circuit detects the frequencies of the separated signals to identify the dialed number, determines validity of the received push-button signal, and outputs the identified dialed number in accordance with the result of validity determination. Level detecting circuit detects the level of the output signal from the amplifying circuit. Gain control circuit controls the amplification gain of the amplifying circuit in accordance with the detected signal level, and holds the value of the amplification gain of the amplifying circuit while the received push-button signal is judged valid by the dialed number identifying circuit.

19 Claims, 7 Drawing Sheets

PUSH-BUTTON SIGNAL RECEIVING DEVICE AND A GAIN CONTROL METHOD

BACKGROUND OF THE INVENTION

1. Field of the Invention

The present invention relates to a push-button signal receiving device for receiving a push-button signal and identifying a dialed number based on the received signal, and a gain control method for a variable gain amplifying circuit provided in such a push-button signal receiving device.

2. Description of the Related Art

In analog telephone communications, push-button signal (hereinafter abbreviated as PB signal) is used as a selection signal whereby a telephone terminal specifies a target of connection. In such communications using the PB signal, one low-frequency signal is combined with one high-frequency signal to create one of 16 different signals, based on which a dialed number is identified. The combination of low- and high-frequency signals is judged to be a valid selection signal if continuously sent out for a fixed time or longer in response to a single dialing operation. Also, between dialing operations, a time period (pause) needs to be provided which is equal to or longer than a prespecified time and in which no signal is present.

In such analog telephone communications, transmit power is prescribed with which the PB signal is transmitted from a telephone terminal. However, the signal level varies due to transmission loss or the like on the line leading to a receiving device that receives the PB signal, making it impossible for the receiving device to determine the minimum input level. Accordingly, to secure a wide dynamic range for the receive signal, there has conventionally been used a PB signal receiving device equipped with an auto gain control (AGC) circuit including an amplifying section and a level detecting section.

FIG. 5 illustrates a schematic configuration of a conventional PB signal receiving device.

The conventional PB signal receiving device 30 shown in FIG. 5 comprises an AGC circuit 31 including a variable gain amplifier 31a for amplifying the input signal and a level detector circuit 31b for detecting the signal level, filter circuits 32 and 33 for separating the input signal into low- and high-frequency signals, and a dialed number identification circuit 34 for detecting the frequencies of the low- and high-frequency signals to identify the dialed number.

In the AGC circuit 31, the level detector circuit 31b detects the level of the output signal of the variable gain amplifier 31a and notifies the amplifier 31a of the detected signal level. In accordance with the value of the signal level detected by the level detector circuit 31b, the variable gain amplifier 31a amplifies the input signal to control the signal level so that the level of the PB signal input to the dialed number identification circuit 34 may fall within a prescribed operating range.

The filter circuits 32 and 33 remove signals of high- and low-frequency bands, respectively, from the output signal of the AGC circuit 31. The dialed number identification circuit 34 detects the frequencies of the output signals from the filter circuits 32 and 33 and, on detecting valid low and high frequencies, identifies and outputs a dialed number specified by the detected low and high frequencies.

The process carried out by the dialed number identification circuit 34 will be described in more detail. In response to the timings of extraction of both the low- and high-frequency signals for frequency detection, the dialed number identification circuit 34 measures the continuance time and discontinuance time of the extracted signals, to determine whether or not the received PB signal is a valid selection signal. FIG. 6 illustrates the received PB signal and validity determination therefor.

As shown in FIG. 6, the dialed number identification circuit 34 detects the frequency of the PB signal input to the PB signal receiving device 30. On detecting both the low- and high-frequency signals, the circuit 34 starts to measure the continuance time of the detected signals, and when a continuance criterion time Ton has elapsed, the circuit 34 judges that the PB signal is valid and outputs a completion signal indicating completion of encoding of the PB signal. Also, if the signals discontinue and thus are not detected, the discontinuance time is measured, and when a discontinuance criterion time Toff has elapsed, the PB signal is judged invalid and the output of the completion signal is stopped. When a signal with the same frequencies is received thereafter, it is judged that the received signal is a different selection signal. The dialed number identified based on the detected frequencies is output at the output timing of the completion signal only for a period valid as the selection signal.

In FIG. 6, the measurement of the continuance time and discontinuance time of the signal is started at the reception start and stop timings, respectively, of the PB signal. In practice, however, the timing for starting the time measurement is delayed in some degree because of the time needed for the frequency detection, etc.

In the PB signal receiving device 30 described above, the input PB signal level is adjusted by the AGC circuit 31 so that the signal level input to the dialed number identification circuit 34 may fall within an operating range of the frequency detection process, irrespective of variations in the received PB signal level attributable, for example, to transmission loss caused in the course of transmission from the telephone terminal, thereby permitting accurate frequency detection.

Also, in the aforementioned configuration of the PB signal receiving device 30, the signal level is detected from a composite wave of low and high frequencies to control the signal level of the input signal, and as a consequence, distortion occurs in the control current for the variable gain amplifier 31a, possibly causing error in the frequency detection. The problem is solved by a PB signal receiving device disclosed in Unexamined Japanese Patent Publication (KOKAI) No. 54-95108. According to the publication, signal level is detected based on the output signals of filter circuits for separating the input PB signal into low- and high-frequency signals, and in accordance with the detected value, the amplification gain of an input-stage variable gain amplifier is controlled to thereby solve the problem.

Meanwhile, in the AGC circuit 31 of the above PB signal receiving device 30, the gain of the variable gain amplifier 31a does not vary exactly following changes in the PB signal level detected by the level detector circuit 31b but a certain length of time is required for the follow-up. Consequently, error can occur in the measurement of time of the extracted signal by the dialed number identification circuit 34, possibly causing a situation where validity of the PB signal fails to be accurately determined.

FIG. 7 is a timing chart showing signals appearing in various parts of the PB signal receiving device 30.

Part (A) in FIG. 7 shows an input signal S31 input to the AGC circuit 31, wherein reception of the input signal S31 by the AGC circuit 31 is temporarily interrupted from timing T701 to timing T702 due to discontinuance of the signal for some reason or due to inclusion of noise in the signal, for example. The discontinuance time of the input signal S31 from T701 to T702 is shorter than the discontinuance criterion time Toff.

Part (B) in FIG. 7 shows a gain A32 of the variable gain amplifier 31a, wherein the gain A32 does not exactly follow the input start and stop timings of the input signal S31 and is varied stepwise.

Part (C) in FIG. 7 shows a signal derived by amplifying the input signal S31 by the variable gain amplifier 31a and S33 output from the AGC circuit 31. In (C) of FIG. 7, the level Gmax represents a maximum value of the operating range in which the frequency can be detected when the signal S33 is input to the dialed number identification circuit 34 through the filter circuits 32 and 33.

Part (D) in FIG. 7 shows the completion signal output from the dialed number identification circuit 34.

In FIG. 7, before timing T701, the completion signal is at H level because of the input of the input signal S31, and the gain A32 of the variable gain amplifier 31a is at a minimum value. The input signal S31 discontinues at timing T701, whereupon the level detector circuit 31b of the AGC circuit 31 detects the discontinuance of the signal, and the gain A32 of the variable gain amplifier 31a is gradually increased. At this time, since the level of the input signal S31 is "0", the signal S33 remains at "0" and the dialed number identification circuit 34, wherein the signal input has discontinued, starts to measure the discontinuance time from timing T701.

Subsequently, the signal S31 is again input at timing T702. Thus, the level detector circuit 31b of the AGC circuit 31 detects the signal input and the gain A32 of the variable gain amplifier 31a is gradually decreased down to the aforementioned minimum value. Consequently, while the gain A32 is decreased to the minimum value, the input signal S31 is amplified as indicated by the signal S33.

The dialed number identification circuit 34 is unable to perform the frequency detection process and thus to detect the input of the input signal S31 until timing T704 at which the level of the amplified signal S33 drops below the level Gmax. If the measured discontinuance time reaches the discontinuance criterion time Toff at timing T703 between T702, at which the signal S31 is actually input again, and T704, the dialed number identification circuit 34 judges that the PB signal is invalid, and stops outputting the completion signal.

Then, the dialed number identification circuit 34 again extracts the PB signal at timing T704 at which the level of the signal S33 drops below the level Gmax, and starts to measure the continuance time. At timing T705 after a lapse of the continuance criterion time Ton, the circuit 34 judges that the PB signal is valid, and again outputs the completion signal.

In the above exemplary operation shown in FIG. 7, even though an actual pause time T from T701 to T702 is shorter than the discontinuance criterion time Toff, the dialed number identification circuit 34 recognizes a time Tw from T701 to T704 as a pause time and stops outputting the completion signal. Thus, where the gain A32 of the variable gain amplifier 31 varies gently, error occurs in the start timing of pause detection by the dialed number identification circuit 34 and the signal can be judged invalid because of a merely instantaneous discontinuance, giving rise to a problem that the dialed number is erroneously recognized.

SUMMARY OF THE INVENTION

The present invention was created in view of the above circumstances, and an object thereof is to provide a PB signal receiving device capable of preventing erroneous determination as to the validity of a received signal that accompanies the insertion of an AGC circuit.

To achieve the above object, there is provided a push-button signal receiving device for receiving a push-button signal and identifying a dialed number based on the received push-button signal. The push-button signal receiving device comprises amplifying circuit for amplifying the received push-button signal, first and second band-pass filters for passing only signals of low- and high-frequency bands, respectively, included in an output signal of the amplifying circuit, dialed number identifying circuit for detecting frequencies of output signals from the first and second band-pass filters to identify a dialed number, determining validity of the received push-button signal, and outputting the dialed number in accordance with a result of the validity determination, level detecting circuit for detecting signal level of the output signal of the amplifying circuit, and gain control circuit for controlling amplification gain of the amplifying circuit in accordance with the detected signal level, and holding the value of the amplification gain while the received push-button signal is judged valid by the dialed number identifying circuit.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Embodiments of the present invention will be hereinafter described with reference to the drawings.

Figure 1:
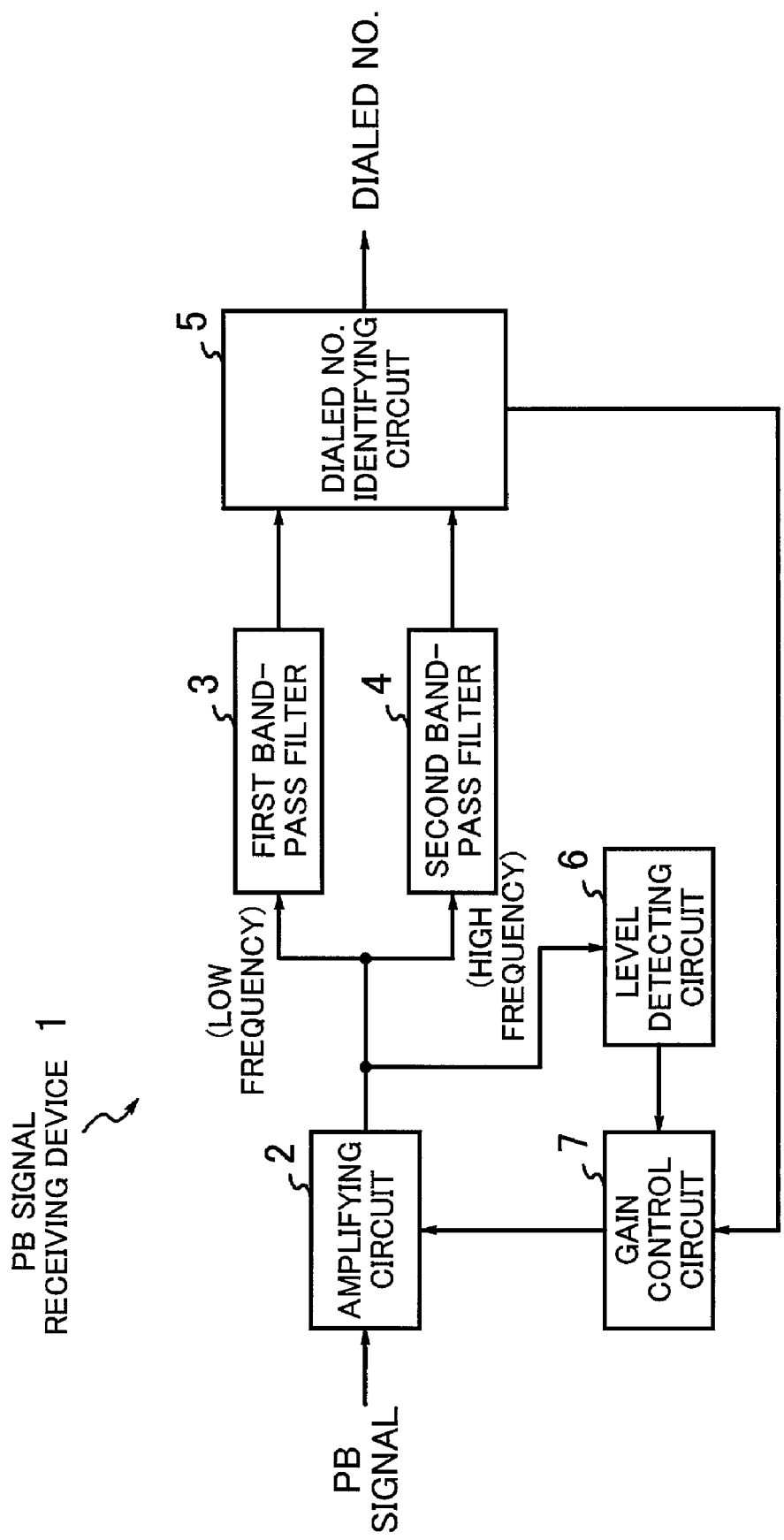
FIG. 1 is a diagram illustrating the principle of a PB signal receiving device according to the present invention.

FIG. 1 illustrates the principle of a PB signal receiving device according to the present invention.

As shown in FIG. 1, the PB signal receiving device 1 of the present invention comprises amplifying circuit 2 for amplifying a received PB signal, first and second band-pass filters 3 and 4 for separating an output signal of the amplifying circuit 2 into signals of low- and high-frequency bands, respectively, dialed number identifying circuit 5 for detecting the frequencies of output signals of the first and second band-pass filters 3 and 4 to identify a dialed number, level detecting circuit 6 for detecting the signal level of the output signal of the amplifying circuit 2, and gain control circuit 7 for controlling the gain of the amplifying circuit 2.

The amplifying circuit 2 amplifies the received PB signal in accordance with the gain controlled by the gain control circuit 7, to adjust its signal level. The first and second band-pass filters 3 and 4 remove, from the output signal of the amplifying circuit 2, signals other than those of low- and high-frequency bands, respectively, to extract only signals of the respective frequency bands. The dialed number identifying circuit 5 detects the frequencies of output signals of the first and second band-pass filters 3 and 4 to identify the dialed number, determines validity of the received PB signal, and outputs the identified dialed number in accordance with the result of the validity determination.

The level detecting circuit 6 detects the signal level of the output signal of the amplifying circuit 2 and notifies the gain control circuit 7 of the detected signal level. In accordance with the signal level detected by the level detecting circuit 6, the gain control circuit 7 controls the amplification gain of the amplifying circuit 2. Also, while the received PB signal is judged valid by the dialed number identifying circuit 5, the gain control circuit recognizes validness of the PB signal and holds the value of the amplification gain of the amplifying circuit 2.

The gain control circuit 7 increases the value of the amplification gain of the amplifying circuit 2 when the signal level detected by the level detecting circuit 6 is low, and decreases the value of the amplification gain when the detected signal level is high. The amplification gain of the amplifying circuit 2 is, however, not varied so as to exactly follow ON and OFF of the input PB signal, but is varied by degrees.

The gain control circuit 7 monitors the validity of the PB signal determined by the dialed number identifying circuit 5. While the PB signal is judged valid, the gain control circuit 7 holds the value of the amplification gain of the amplifying circuit 2 so that the signal level may not change. Thus, even if, during the reception of a valid PB signal, the PB signal undergoes instantaneous discontinuance that does not constitute invalidity of the signal, the signal level input again to the dialed number identifying circuit 5 after the discontinuance does not change, so that stable frequency detection is performed to extract low- and high-frequency signals. It is therefore possible to prevent an erroneous judgment that the PB signal is invalid from being made based on instantaneous discontinuance, permitting accurate identification of the dialed number.

While the received PB signal is judged valid, the dialed number identifying circuit 5 outputs, for example, a completion signal indicating the completion of a process in which the dialed number identified through the frequency detection is output in accordance with the validity determination. On receiving the completion signal, the gain control circuit 7 recognizes that the PB signal is judged valid.

The completion signal is set at H level if the low- and high-frequency signals are extracted by the dialed number identifying circuit 5 through detection of the frequencies of the output signals from the first and second band-pass filters 3 and 4 and also if the extraction of both signals has continued for a fixed time, and is set at L level if the signals have been discontinued over a second fixed time. When the completion signal is at H level, the gain control circuit 7 holds the value of the amplification gain of the amplifying circuit 2. This enables the gain control circuit 7 to easily detect the result of validity determination made by the dialed number identifying circuit 5 with the use of an existing output signal.

If there occurs a frequency-dependent transmission loss in the course of transmission to the PB signal receiving device 1 or there is a gain difference between the first and second band-pass filters 3 and 4, the signal level of either one of the low- and high-frequency signals, which are input to the dialed number identifying circuit 5 through the filters after a composite signal of low and high frequencies is amplified by the amplifying circuit 2, may fail to fall within the operating range of frequency detection, with the result that the dialed number is erroneously recognized.

To prevent this, the PB signal receiving device 1 may be configured such that the level detecting circuit 6 detects the levels of the output signals from the first and second band-pass filters 3 and 4. In this case, the gain control circuit 7 controls the value of the amplification gain of the amplifying circuit 2 so that the levels of the output signals from the first and second band-pass filters 3 and 4, detected by the level detecting circuit 6, may individually fall within the operating range of the frequency detection process performed by the dialed number identifying circuit 5, whereby erroneous recognition of the dialed number attributable to the level difference between the low- and high-frequency signals can be prevented.

In general, the transmission loss caused in the course of transmission to the PB signal receiving device 1 is greater in high-frequency signal than in low-frequency signal. Accordingly, the PB signal receiving device 1 may be configured such that the level detecting circuit 6 detects only the signal level of the output signal from the second band-pass filter 4 which passes signal of high-frequency band.

Figure 2:
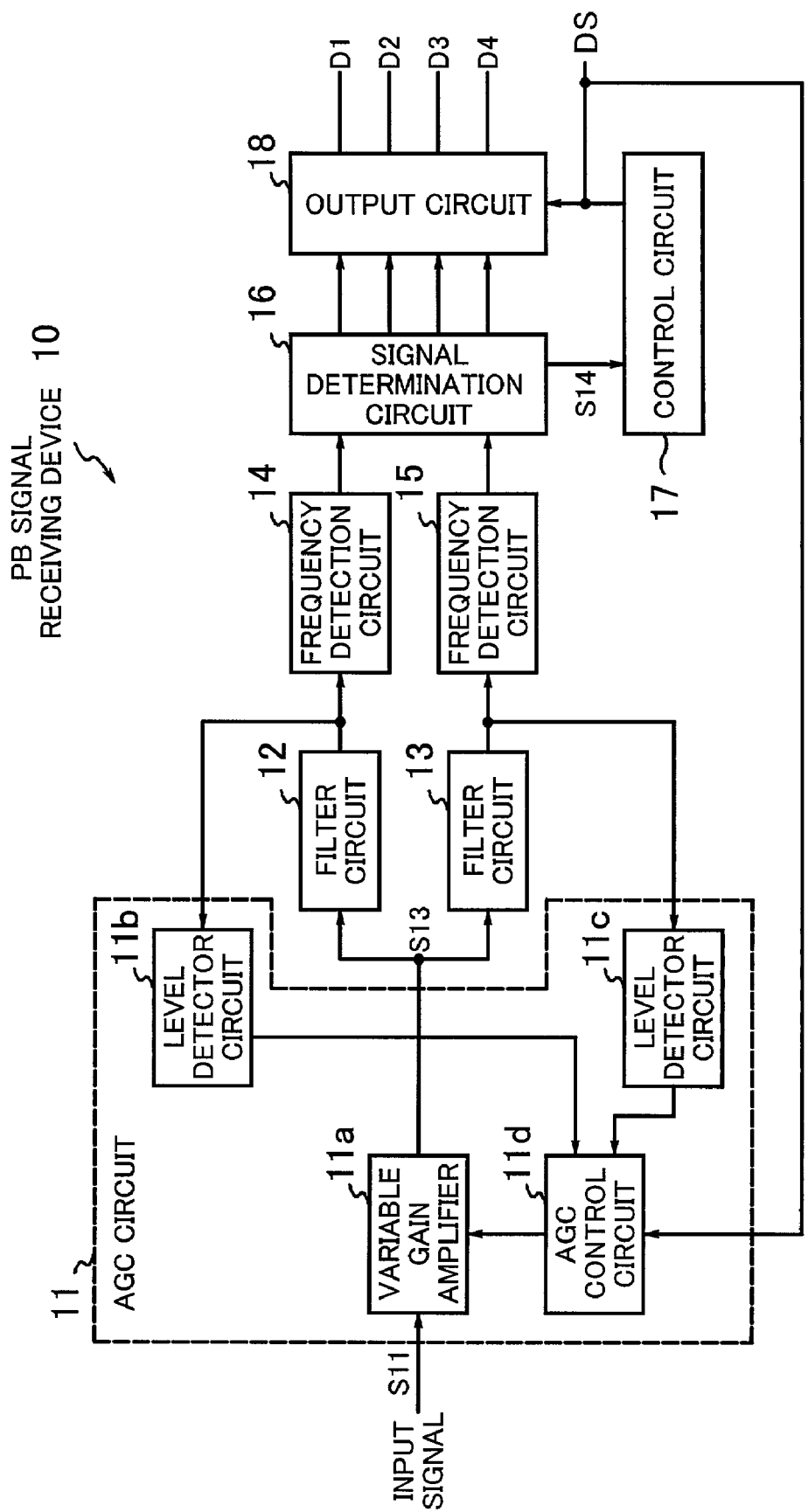
FIG. 2 is a diagram schematically illustrating an exemplary configuration of a PB signal receiving device according to a first embodiment of the present invention.

A first embodiment of the present invention will be now described. FIG. 2 schematically illustrates an exemplary configuration of a PB signal receiving device according to the present invention. In the embodiment shown in FIG. 2, the input signal is amplified in accordance with the levels of the separated signals of low- and high-frequency bands.

The PB signal receiving device 10 shown in FIG. 2 is a device for identifying a specified dialed number based on a PB signal transmitted in accordance with DTMF (Dial Tone Multi Frequency) system. The device 10 comprises an AGC circuit 11 for amplifying a received PB signal in accordance with signal levels, filter circuits 12 and 13 for separating an output signal of the AGC circuit 11 into signals of low- and high-frequency bands, frequency detection circuits 14 and 15 for detecting frequencies of output signals of the filter circuits 12 and 13, a signal determination circuit 16 for determining a dialed number based on the frequencies detected by the frequency detection circuits 14 and 15, a control circuit 17 for determining a length of validity as a selection signal, and an output circuit 18 for outputting number data having a valid length.

The AGC circuit 11 includes a variable gain amplifier 11a for amplifying the received PB signal, level detector circuits 11b and 11c for detecting the levels of the output signals from the filter circuits 12 and 13, respectively, and an AGC control circuit 11d for controlling the amplification gain of the variable gain amplifier 11a.

The variable gain amplifier 11a amplifies the received PB signal in accordance with an AGC control voltage from the AGC control circuit 11d. The level detector circuits 11b and 11c detect the signal levels of the output signals from the filter circuits 12 and 13, respectively. In accordance with the signal levels detected by the level detector circuits 11b and 11c, the AGC control circuit 11d applies the AGC control voltage to the variable gain amplifier 11a to control the amplification gain. In this case, the AGC control circuit 11d controls the variable gain amplifier 11a so that the signal levels of the output signals from the filter circuits 12 and 13, detected by the level detector circuits 11b and 11c, may fall within respective operating ranges of the frequency detection circuits 14 and 15. Also, the AGC control circuit 11d is supplied with a completion signal from the control circuit 17, and holds the value of the AGC control voltage while the completion signal is at H level, as described later.

The filter circuits 12 and 13 remove, from the output signal of the variable gain amplifier 11a, signals of high- and low-frequency bands, respectively. The frequency detection circuits 14 and 15 detect the frequencies of output signals from the filter circuits 12 and 13, respectively, to extract signals of the respective frequency bands. In DTMF-based analog telephone communications, low-frequency signal includes those with frequencies of 697 Hz, 770 Hz, 852 Hz and 941 Hz, and high-frequency signal includes those with frequencies of 1209 Hz, 1336 Hz, 1477 Hz and 1633 Hz.

When valid low and high frequencies are both detected by the frequency detection circuits 14 and 15, the signal determination circuit 16 outputs a detection signal indicative of detection of the low- and high-frequency signals to the control circuit 17. Also, the circuit 16 identifies the dialed number based on the combination of the detected low and high frequencies, and outputs number data indicative of the identified number to the output circuit 18. The control circuit 17 monitors continuance time and discontinuance time of the input detection signal, to determine whether or not the received PB signal is in a valid state as the selection signal, and outputs the completion signal indicative of the result of the validity determination to the output circuit 18 and the AGC control circuit 11d. The output circuit 18 outputs the number data determined by the signal determination circuit 16, at output timing based on the completion signal from the control circuit 17, as 4-bit data D1, D2, D3 and D4, for example.

The manner of how the completion signal is output will be described in more detail.

The completion signal output from the control circuit 17 indicates a state in which a process for encoding the dialed number based on the received PB signal has been completed and also the received PB signal has been judged valid as the selection signal. The signal determination circuit 16 derives a logical product of the low- and high-frequency signals extracted by the frequency detection circuits 14 and 15, to output the detection signal indicating that both low- and high-frequency signals have been detected. When supplied with the detection signal, the control circuit 17 starts to measure the input continuance time. If the input continues over a continuance criterion time Ton, the input PB signal is judged valid, and the completion signal is set at H level. On the other hand, when the input of the detection signal is discontinued, the discontinuance time is measured. If the input remains discontinued over a discontinuance criterion time Toff, the PB signal is judged invalid and the completion signal is set at L level. Thus, signal with the same frequencies extracted thereafter is judged to be a different selection signal. The output circuit 18 outputs number data indicative of the identified dialed number only when the completion signal is at H level, whereby the number data can be encoded with accuracy.

In the above PB signal receiving device 10, the AGC control circuit 11d controls the variable gain amplifier 11a so that the levels of the output signals from the filter circuits 12 and 13, detected by the level detector circuits 11b and 11c, may fall within the respective operation ranges of the frequency detection circuits 14 and 15. In the AGC circuit 11, however, the gain of the variable gain amplifier 11a does not vary exactly following the signal level changes detected by the level detector circuits 11b and 11c, and a certain length of time is needed before the input signal is amplified or compressed to a target signal level. Consequently, error can occur in the measurement of the discontinuance time of the detection signal by the control circuit 17 to an extent such that an instantaneous pause shorter than the discontinuance criterion time Toff is recognized as indicating invalidity of the signal, possibly causing erroneous operation in relation to the output of dialed number.

To solve the problem, the PB signal receiving device 10 is configured such that the completion signal is supplied to the AGC control circuit 11d, in addition to the output circuit 18. While the completion signal is at H level, the AGC control voltage output to the variable gain amplifier 11a from the AGC control circuit 11d is controlled at a constant level.

Figure 3:
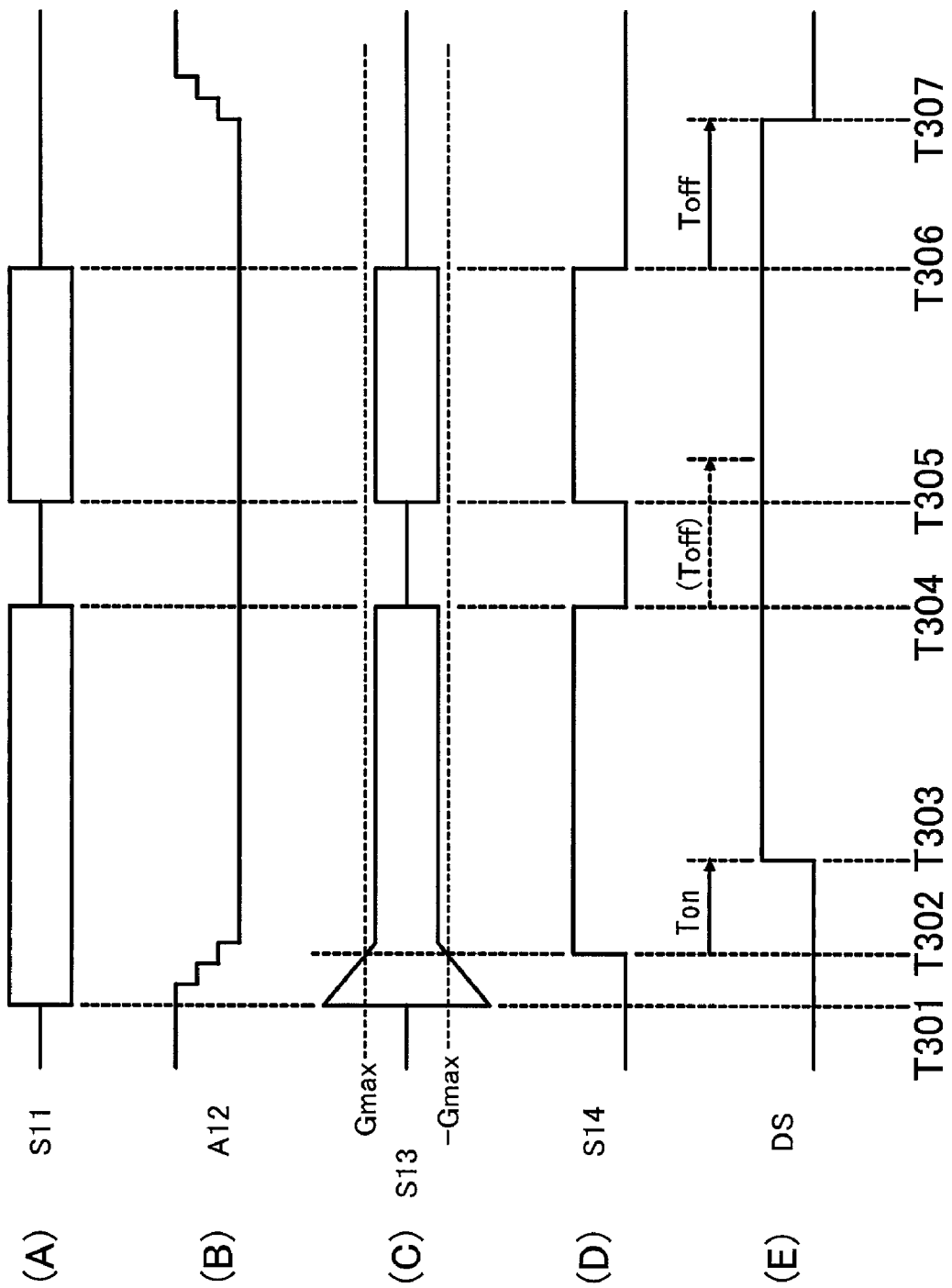
FIG. 3 is a timing chart showing time-based changes of signals appearing in various parts of the PB signal receiving device.

FIG. 3 is a timing chart showing signals appearing in various parts of the PB signal receiving device 10. In FIG. 3, signal output delays attributable to the operations of the variable gain amplifier 11a, filter circuits 12 and 13, and frequency detection circuits 14 and 15 are not illustrated.

Part (A) of FIG. 3 shows an input signal S11 input to the AGC circuit 11. The signal S11 is input from T301 to T306, and in the middle the reception of the input signal S11 is temporarily interrupted from T304 to T305 for some reason or due to inclusion of noise, for example. The time of discontinuance of the input signal S11 from T304 to T305 is shorter than the discontinuance criterion time Toff.

Part (B) of FIG. 3 shows a gain A12 of the variable gain amplifier 11a. The gain A12 does not vary exactly following the input start and stop timings of the input signal S11, but varies stepwise.

Part (C) of FIG. 3 shows an output signal S13 from the AGC circuit 11, obtained by amplifying the input signal S11 by the variable gain amplifier 11a. In (C) of FIG. 3, level Gmax represents a maximum value of an operating range in which frequency detection can be performed when the signal S13 is supplied to the frequency detection circuit 14, 15 via the filter circuit 12, 13.

Part (D) of FIG. 3 shows the output of the signal determination circuit 16 derived as a logical product of the low- and high-frequency signals extracted by the frequency detection circuits 14 and 15, that is, the detection signal indicating that the low- and high-frequency signals have been detected. Part (E) of FIG. 3 shows the completion signal output from the control circuit 17.

The signal S11 is input at timing T301 in FIG. 3, whereupon a rise of the signal level is detected by the level detector circuits 11b and 11c, and the gain A12 of the variable gain amplifier 11a is decreased by the AGC control circuit 11d. At this time, the gain A12 of the variable gain amplifier 11a decreases stepwise, and accordingly, the signal S13 output from the AGC circuit 11 is temporarily amplified and is then gradually compressed thereafter. Because of such a temporary rise in the signal level due to the gain A12, the levels of the signals input to the frequency detection circuits 14 and 15 via the filter circuits 12 and 13 exceed the respective operating ranges of frequency detection, with the result that the low- and high-frequency signals cannot be detected until the signal levels gradually lower and drop below the level Gmax at timing T302. Consequently, the output of the detection signal S14 from the signal determination circuit 16 starts from timing T302.

Also, at timing T302, the control circuit 17 starts to measure the continuance time of the detection signal. When the continuance criterion time Ton has elapsed at timing T303, the received PB signal is judged valid, and the completion signal is output. At this time, the output circuit 18 outputs number data D1 to D4.

The input signal S11 discontinues at timing T304, whereupon the signal determination circuit 16 stops outputting the detection signal S14 and the control circuit 17 starts to measure the discontinuance time. At this time, a decrease in the signal level is detected by the level detector circuits 11b and 11c, but since the completion signal remains at H level, the AGC control circuit 11d does not change the gain A12 of the variable gain amplifier 11a.

The signal S11 is again input at timing T305, and thus the signal determination circuit 16 again starts to output the detection signal S14. At this point of time, the discontinuance criterion time Toff has not yet passed from timing T304; accordingly, the control circuit 17 does not judge the PB signal to be invalid but continuously outputs the completion signal.

The input signal S11 discontinues at timing T306, whereupon the output of the detection signal S14 from the signal determination circuit 16 is stopped and the control circuit 17 starts to measure the discontinuance time. At this time, the completion signal is at H level, and therefore, the gain A12 of the variable gain amplifier 11a is not changed.

At timing T307 after a lapse of the discontinuance criterion time Toff, the control circuit 17 judges that the PB signal is invalid, and sets the completion signal at L level. On recognizing that the signal levels detected by the level detector circuits 11b and 11c are nearly zero and that the completion signal has turned to L level, the AGC control circuit 11d increases the gain A12 of the variable gain amplifier 11a.

In the operation described above, when the signal S11 is again input at timing T305 at which the discontinuance criterion time Toff has not yet passed from the start of discontinuance of the input signal S11 at timing T304, the AGC control circuit lid recognizes that the completion signal is at H level, and thus holds the gain A12 of the variable gain amplifier 11a. Consequently, the input signals to the frequency detection circuits 14 and 15 do not deviate from the operating ranges at timing T305, thus enabling the frequency detection circuits 14 and 15 to normally operate from the re-input timing of the input signal S11. This prevents the control circuit 17 from erroneously regarding an instantaneous discontinuance of the PB signal shorter than the discontinuance criterion time Toff as indicating invalidity of signal, thereby preventing erroneous recognition of the dialed number.

The low- and high-frequency signals input to the PB signal receiving device 10 may have a level difference because of a difference in the transmission loss dependent on frequency bands, or there may be a difference in gain between the filter circuits 12 and 13 associated with the respective low- and high-frequency signals. In the above PB signal receiving device 10, the variable gain amplifier 11a amplifies a composite signal of low and high frequencies, and therefore, if there is a great level difference between the low- and high-frequency signals, either of the input signals to the frequency detection circuits 14 and 15 may fail to fall within the operating range, causing error in the detection timings of the low- and high-frequency signals and making it impossible to accurately identify the dialed number.

To prevent such situations, the PB signal receiving device 10 is configured such that the signal levels of both signals output from the filter circuits 12 and 13 are detected by the level detector circuits 11b and 11c, and that the AGC control circuit 11d controls the gain of the variable gain amplifier 11a in accordance with the detected signal levels. For example, the AGC control circuit 11d controls the gain so as to amplify the input signal if the signal level of either of the output signals from the filter circuits 12 and 13 is lower than the operating range of the frequency detection circuits 14, 15, and to compress the input signal if the signal level is higher than the operating range. As a consequence, the gain of the variable gain amplifier 11a can be adjusted so that the levels of the output signals of the filter circuits 12 and 13 may both fall within the respective operating ranges, whereby the frequency detection circuits 14 and 15 can simultaneously detect low- and high-frequency signals, respectively.

Also, in analog telephone communications, the transmission loss caused in the course of transmission from a telephone terminal to the PB signal receiving device is generally larger in high-frequency signal than in low-frequency signal. For example, in the case of CCP (Color Coded Polyethylene) cable for local telephone lines, the loss of the 697-Hz low-frequency signal can be 27 dB or thereabout when a loss of about 39 dB has occurred in the 1477-Hz high-frequency signal. In such cases, the gain of the variable gain amplifier may be controlled in accordance with the signal level of the high-frequency input signal.

Figure 4:
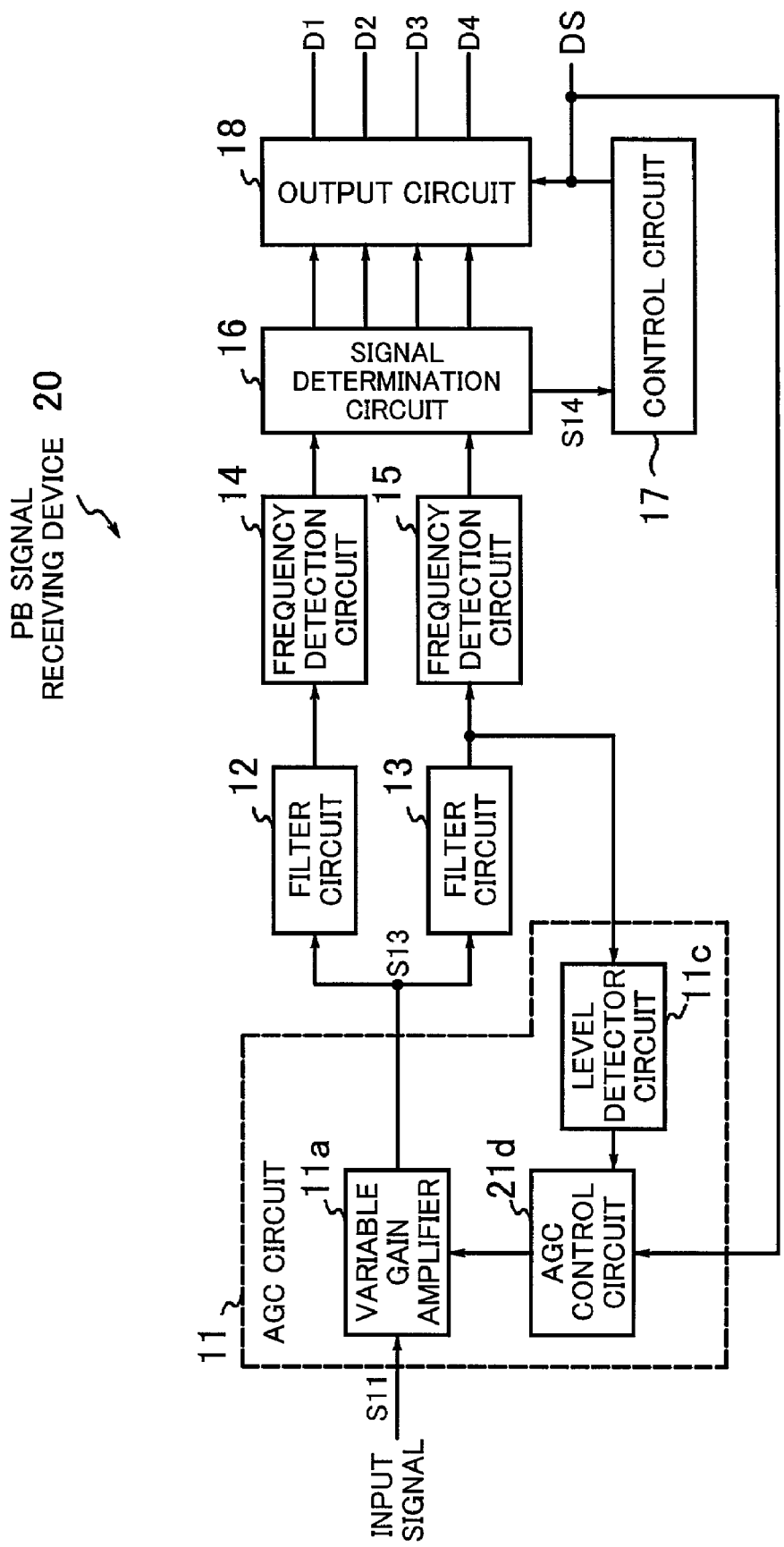
FIG. 4 is a diagram schematically illustrating an exemplary configuration of a PB signal receiving device according to a second embodiment of the present invention.
Figure 5:
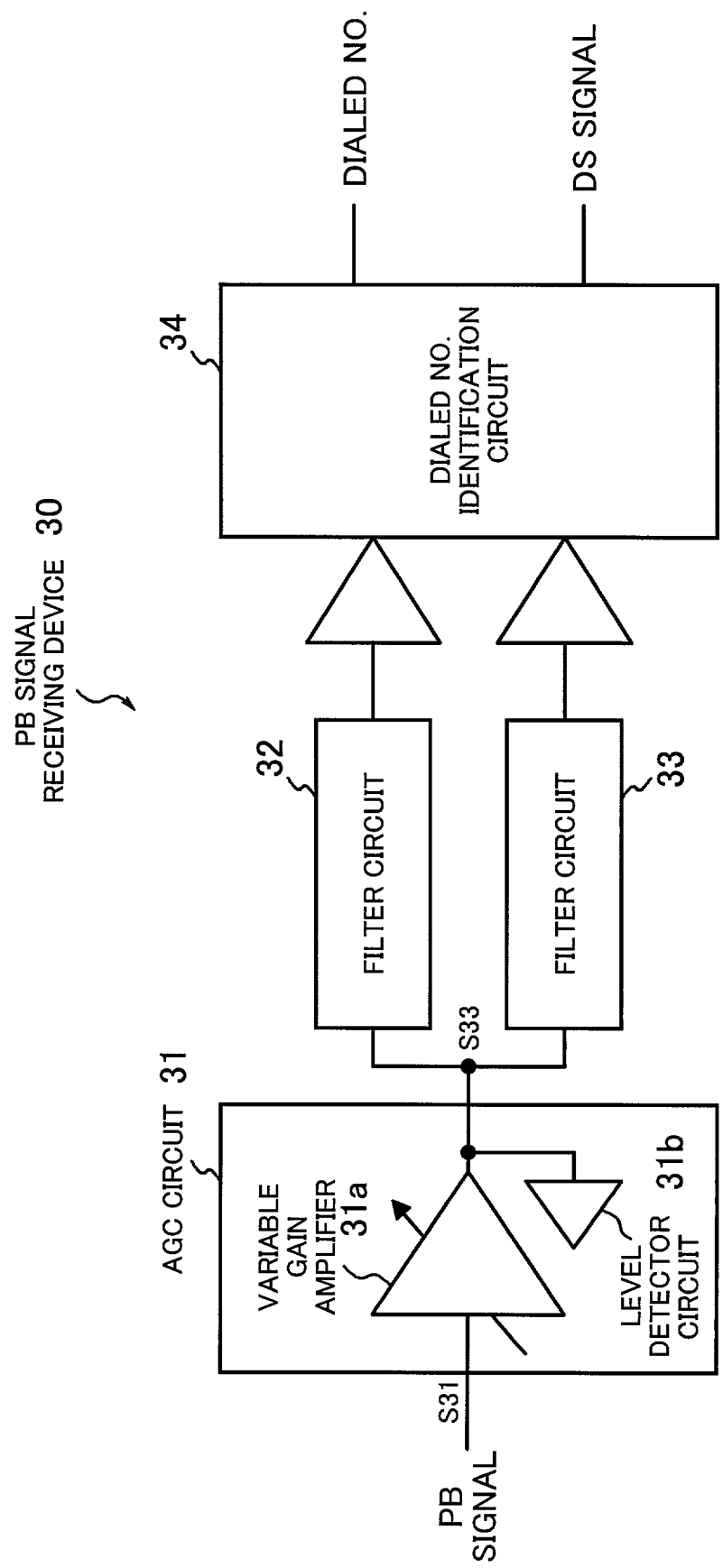
FIG. 5 is a diagram schematically illustrating a configuration of a conventional PB signal receiving device.
Figure 6:
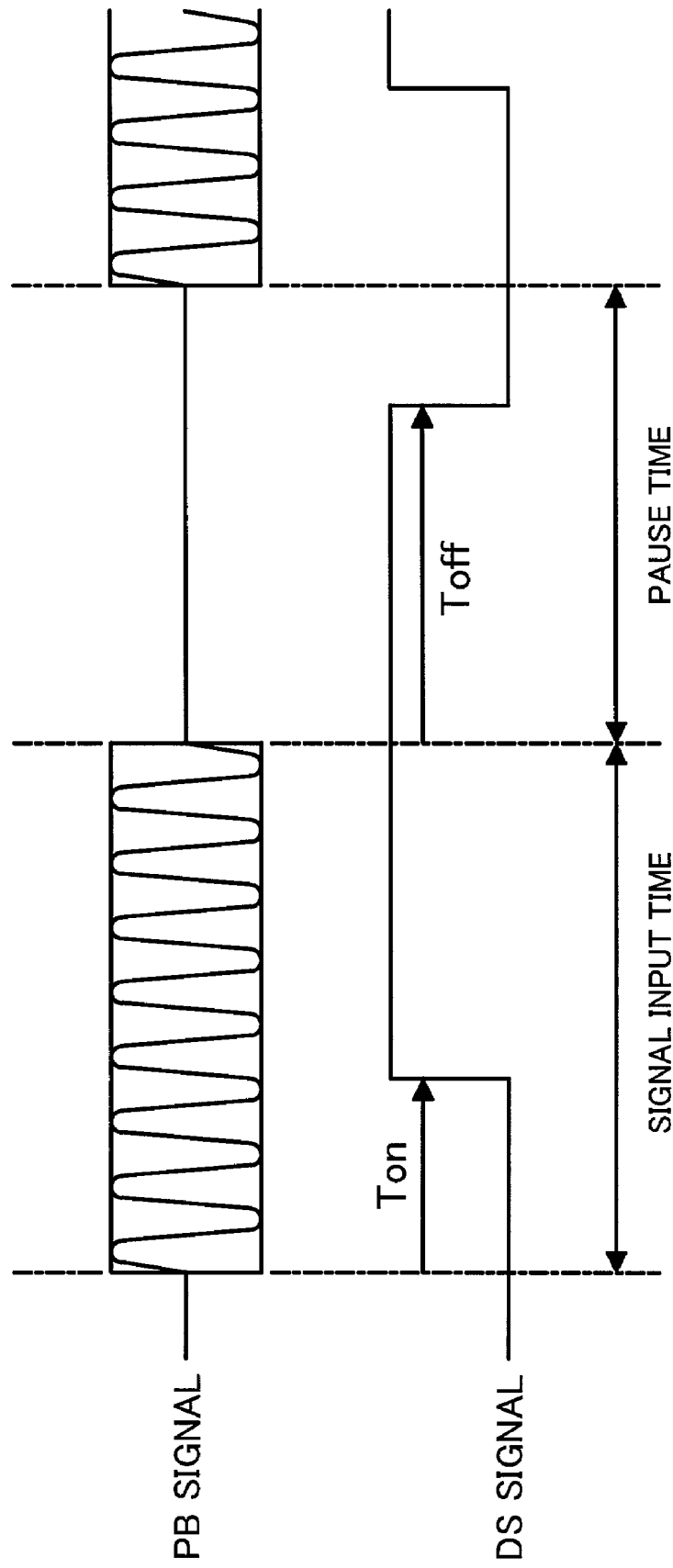
FIG. 6 is a chart illustrating a received PB signal and validity determination therefor.
Figure 7:
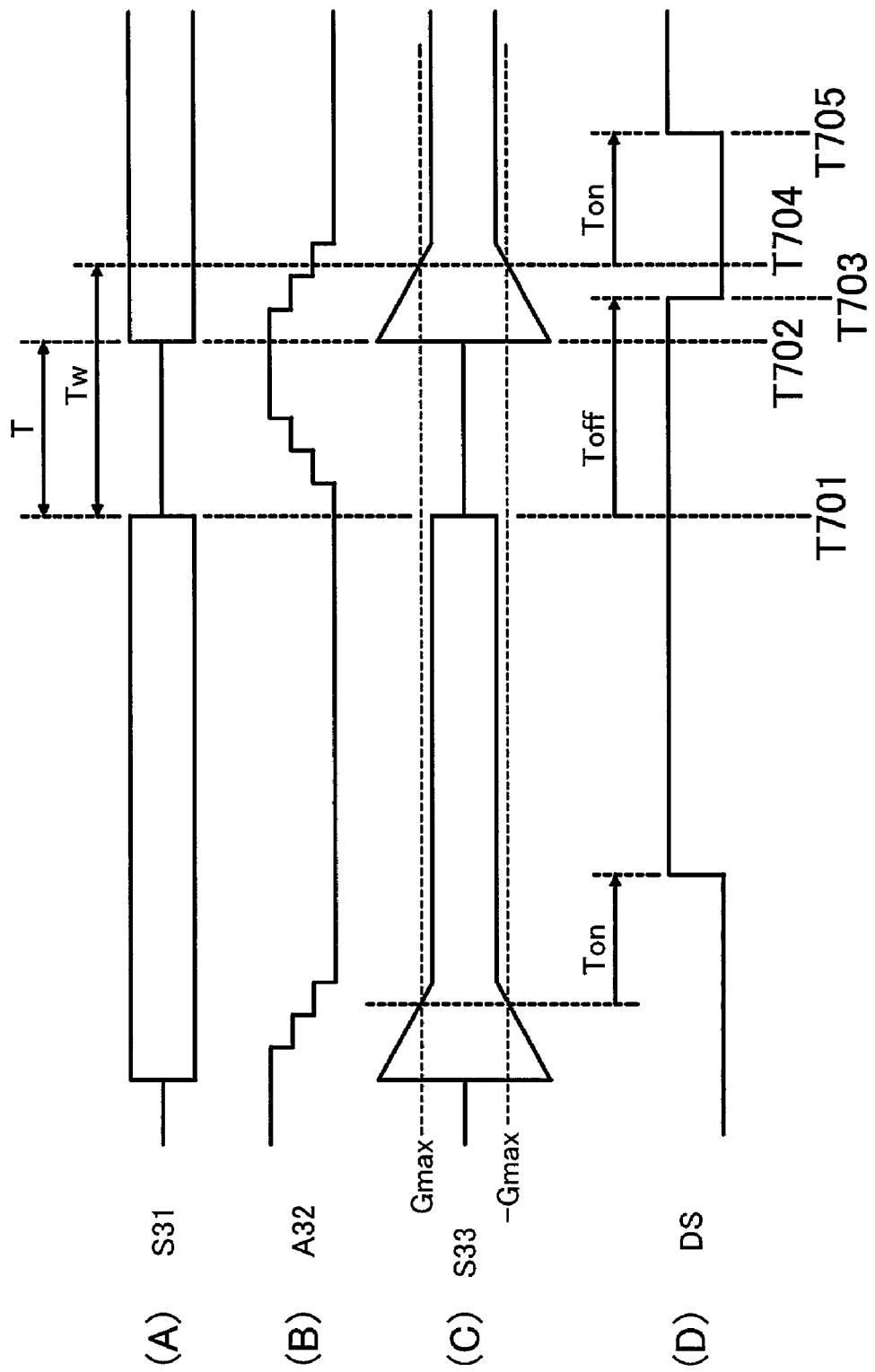
FIG. 7 is a timing chart showing time-based changes of signals appearing in various parts of the conventional PB signal receiving device.

FIG. 4 schematically illustrates an exemplary configuration of a PB signal receiving device according to a second embodiment of the present invention, wherein the input signal is amplified in accordance with the signal level of the high-frequency signal. In FIG. 4, identical reference numerals are used to denote elements corresponding to those in the PB signal receiving device 10 shown in FIG. 2, and detailed description of such elements is omitted.

In the PB signal receiving device 20 shown in FIG. 4, signals of low- and high-frequency bands are output from the filter circuits 12 and 13 and the frequencies thereof are detected by the frequency detection circuits 14 and 15, respectively, as in the device shown in FIG. 2. The level detector circuit 11c detects the level of the output signal of high-frequency band from the filter circuit 13. When the signal level detected by the level detector circuit 11c is lower than the operating range of the frequency detection circuit 15, an AGC control circuit 21d controls the variable gain amplifier 11a such that the input signal is amplified in accordance with the detected signal level.

In the AGC control circuit 21d, an estimated value of level difference between the low- and high-frequency signals is set beforehand with respect to each combination of low- and high-frequency signals, for example. The AGC control circuit 21 controls the gain of the variable gain amplifier 11a in accordance with the estimated value so that the output signals from the filter circuits 12 and 13 may have signal levels falling within the respective operating ranges of the frequency detection circuits 14 and 15.

As a consequence of such operation, even in cases where the high-frequency signal has a relatively low signal level compared with the low-frequency signal, the frequency detection circuits 14 and 15 can be supplied with suitably amplified signals, whereby the PB signal receiving device 20 can accurately identify the dialed number.

As described above, in the PB signal receiving device of the present invention, the level detecting circuit detects the signal level of the signal output from the amplifying circuit to the first and second band-pass filters. The gain control circuit controls the amplification gain of the amplifying circuit in accordance with the signal level detected by the level detecting circuit, and also holds the value of the amplification gain of the amplifying circuit while the received push-button signal is judged valid by the dialed number identifying circuit. This prevents an erroneous judgment that the received PB signal is invalid from being made in response to instantaneous discontinuance of the input PB signal, thus making it possible to identify the dialed number with accuracy.

The present invention is also applicable to a signal processing device which receives an input signal having a plurality of frequency components to perform predetermined signal processing. In this case, the signal processing device first amplifies the input signal and separates the signal into signals with respective frequency components by means of band-pass filters. Then, the frequencies of the separated signals, for example, are detected to extract signals having respective two frequency components. Based on the extracted signals, the predetermined signal processing is performed and also a determination is made as to whether the received input signal is valid or not. If the input signal is judged valid, the signal processing result is output. In this case, while the input signal is judged valid, the amplification gain is held as it is so that the input signal may not be further amplified before the separation, whereby an erroneous judgment that the input signal is invalid is prevented from being made in response to instantaneous discontinuance of the input signal. It is therefore possible to output the signal processing result with accuracy.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A push-button signal receiving device for receiving a push-button signal and identifying a dialed number based on the received push-button signal, comprising:

amplifying circuit for amplifying the received push-button signal;

first and second band-pass filters for passing only signals of low- and high-frequency bands, respectively, included in an output signal of said amplifying circuit;

dialed number identifying circuit for detecting frequencies of output signals from said first and second band-pass filters to identify a dialed number, determining validity of the received push-button signal, and outputting the dialed number in accordance with a result of the validity determination;

level detecting circuit for detecting signal level of the output signal of said amplifying circuit; and gain control circuit for controlling amplification gain of said amplifying circuit in accordance with the detected signal level, and holding a value of the amplification gain while the received push-button signal is judged valid by said dialed number identifying circuit.

2. The push-button signal receiving device according to claim 1, wherein, while the received push-button signal is judged valid, said dialed number identifying circuit outputs a completion signal indicating completion of a process in which the dialed number identified through the frequency detection is output in accordance with the result of validity determination, and said gain control circuit holds the value of the amplification gain while being supplied with the completion signal.

3. The push-button signal receiving device according to claim 2, wherein said dialed number identifying circuit further comprises first and second frequency detection circuits which extract the low- and high-frequency signals respectively by detecting the frequencies of the output signals of said first and second band-pass filters.

4. The push-button signal receiving device according to claim 3, wherein the completion signal is set at H level if both of the extracted signals have continued for a fixed time, and is set at L level if both of the extracted signals have discontinued over a second fixed time.

5. The push-button signal receiving device according to claim 1, wherein said gain control circuit decreases the value of the amplification gain of said amplifying circuit when the signal level detected by said level detecting circuit is high, and increases the value of the amplification gain when the detected signal level is low.

6. The push-button signal receiving device according to claim 1, wherein said level detecting circuit detects signal level of each of the output signals from said first and second band-pass filters.

7. The push-button signal receiving device according to claim 6, wherein said gain control circuit controls the value of the amplification gain of said amplifying circuit such that the signal levels of the output signals from said first and second band-pass filters, detected by said level detecting circuit, fall within respective operating ranges of frequency detection process performed by said dialed number identifying circuit.

8. The push-button signal receiving device according to claim 1, wherein said level detecting circuit detects signal level of the output signal from said second band-pass filter.

9. The push-button signal receiving device according to claim 8, wherein said gain control circuit controls the value of the amplification gain of said amplifying circuit in accordance with an estimated value which is indicative of an input level difference between the low- and high-frequency signals and which is set beforehand with respect to each combination of the low- and high-frequency signals, such that the signal level detected by said level detecting circuit falls within an operating range of frequency detection process performed by said dialed number identifying circuit.

10. A gain control method for a variable gain amplifying circuit, wherein a push-button signal is received and frequency thereof is detected via the variable gain amplifying circuit to identify a dialed number, said method comprising:

detecting signal level of an output signal from the variable gain amplifying circuit, and controlling amplification gain of the variable gain amplifying circuit in accordance with the detected signal level;

receiving output signals from first and second band-pass filters to perform predetermined signal processing and to make a determination of validity of a received input signal, and outputting a result of the predetermined signal processing when the received input signal is judged valid, wherein each of said first and second band-pass filters passes only a signal having one frequency component, out of a plurality of frequency components included in an output signal of said amplifying circuit; and holding the value of the amplification gain while the received input signal is judged valid.

11. A signal processing device for receiving an input signal having a plurality of frequency components to perform predetermined signal processing, comprising:
   amplifying circuit for amplifying the received input signal;
   first and second band-pass filters each for passing only a signal having one frequency component, out of said plurality of frequency components included in an output signal of said amplifying circuit;
   signal processing circuit for receiving output signals from said first and second band-pass filters to perform the predetermined signal processing and to make a determination of validity of the received input signal, said signal processing circuit outputting a result of the predetermined signal processing when the received input signal is judged valid;
   level detector circuit for detecting signal level of the output signal of said amplifying circuit; and
   gain control circuit for controlling amplification gain of said amplifying circuit in accordance with the signal level detected by said level detector circuit, and holding the value of the amplification gain while the received input signal is judged valid by said signal processing circuit.

12. The signal processing device according to claim 11, wherein, while the received input signal is judged valid, said signal processing circuit outputs a completion signal indicating completion of a process for outputting the result of the predetermined signal processing, and
   said gain control circuit holds the value of the amplification gain while being supplied with the completion signal.

13. The signal processing device according to claim 11, wherein said signal processing circuit includes first and second signal extraction circuits for detecting frequencies of the output signals of said first and second band-pass filters, respectively, to extract signals corresponding to respective two frequency components out of said plurality of frequency components.

14. The signal processing device according to claim 13, wherein said completion signal is set at H level if the extracted signals corresponding to the two frequency components have continued for a first fixed time, and is set at L level if the extracted signals corresponding to the two frequency components have discontinued over a second fixed time.

15. The signal processing device according to claim 11, wherein said gain control circuit decreases the value of the amplification gain of said amplifying circuit when the signal level detected by said level detector circuit is high, and increases the value of the amplification gain when the detected signal level is low.

16. The signal processing device according to claim 11, wherein said level detector circuit detects signal level of each of the output signals from said first and second band-pass filters.

17. The signal processing device according to claim 16, wherein said gain control circuit controls the value of the amplification gain of said amplifying circuit such that the signal levels of the output signals from said first and second band-pass filters, detected by said level detector circuit, fall within respective operating ranges of the predetermined signal processing performed by said signal processing circuit.

18. The signal processing device according to claim 11, wherein said level detector circuit detects signal level of the output signal from one of said first and second band-pass filters.

19. The signal processing device according to claim 18, wherein said gain control circuit controls the value of the amplification gain of said amplifying circuit in accordance with an estimated value which is indicative of an input level difference between signals having respective frequency components and which is set beforehand with respect to each combination of said plurality of frequency components, such that the signal level detected by said level detector circuit falls within an operating range of the predetermined signal processing performed by said signal processing circuit.

* * * * *